United States Patent
Babi et al.

(10) Patent No.: US 7,953,213 B2
(45) Date of Patent: May 31, 2011

(54) SYSTEMS AND METHODS FOR PROVIDING PREPAID COLLECT TELECOMMUNICATIONS SERVICE

(75) Inventors: Rene Pierre Babi, Vancouver, WA (US); Mark Mathias Silbernagel, Battle Ground, WA (US)

(73) Assignee: Aurora Financial Systems, Inc., Greenwich, CT (US)

( * ) Notice: Subject to any disclaimer, the term of this patent is extended or adjusted under 35 U.S.C. 154(b) by 1210 days.

(21) Appl. No.: 11/634,216

(22) Filed: Dec. 6, 2006

(65) Prior Publication Data

US 2007/0140450 A1  Jun. 21, 2007

Related U.S. Application Data

(60) Provisional application No. 60/742,531, filed on Dec. 6, 2005.

(51) Int. Cl.
*H04M 15/00* (2006.01)
*H04M 11/00* (2006.01)
(52) U.S. Cl. ............... 379/114.2; 379/114.21; 455/406
(58) Field of Classification Search ............. 379/114.01, 379/114.2–114.25, 144.02, 210.01, 223; 455/405–408; 705/39, 44
See application file for complete search history.

(56) References Cited

U.S. PATENT DOCUMENTS

| | | | |
|---|---|---|---|
| 5,740,229 A * | 4/1998 | Hanson et al. ............. | 379/114.2 |
| 6,424,706 B1 | 7/2002 | Katz et al. | |
| 6,775,365 B1 * | 8/2004 | Norby ......................... | 379/143 |
| 7,116,768 B2 * | 10/2006 | Smith et al. ............. | 379/114.21 |
| 7,761,082 B2 * | 7/2010 | Mongazon-Cazavet et al. ............................ | 455/405 |
| 2003/0045267 A1 | 3/2003 | Himmel et al. | |

\* cited by examiner

*Primary Examiner* — Quoc D Tran
(74) *Attorney, Agent, or Firm* — Joseph P. Kincart; Ideation Law

(57) ABSTRACT

A method of transmitting value via a telephone system, includes receiving a request from a Grantor to designate a predetermined number of minutes that are to be reserved to fund a telephone call between a telephone number associated with a Beneficiary and a telephone number belonging to the Grantor, receiving a request to establish the telephone call between the telephone number associated with the Beneficiary and the telephone number belonging to the Grantor, establishing the telephone call between the telephone number associated with the Beneficiary and the telephone number belonging to the Grantor, and deducting from the predetermined number of minutes a number of minutes corresponding to a length of time of the call between the telephone number associated with the Beneficiary and the telephone number belonging to the Grantor.

19 Claims, 2 Drawing Sheets

SYSTEMS AND METHODS FOR PROVIDING PREPAID COLLECT TELECOMMUNICATIONS SERVICE

This applications claims the benefit of U.S. Provisional application No. 60/742,531, filed Dec. 6, 2005, which is incorporated by reference herein in its entirety.

FIELD OF THE INVENTION

The present invention is related to telecommunication services. More particularly, the present invention is related to systems and methods for providing prepaid collect telecommunications service between telecommunications users, such as mobile telephone users.

BACKGROUND

Recently, prepaid mobile or wireless telephony has become increasingly popular. At a high level, prepaid service allows users to pre-purchase "minutes" of air time or long distance tolls thereby avoiding conventional billing practices (e.g., monthly mailed bills). Prepaid service is particularly desirable for users whose financial credit may not be sufficiently strong to warrant a conventional mobile telephone account where users pay for service that has already been rendered. Traveling users and users who simply do not want the aggravation of bills also often opt for prepaid service. Conventionally, prepaid users purchase minutes directly from a mobile service provider or by purchasing prepaid phone cards that are typically available at, e.g., grocery and convenience stores.

It is not always convenient, however, to purchase prepaid minutes in the traditional manner. In this regard, one recent interesting advance in prepaid wireless service is the ability to transfer minutes from one phone (account) to another, such that the recipient of the minutes need not, himself, directly purchase the minutes. This service is described in U.S. Patent Application Publication US2003/0045267 A1 to Himmel et al. As explained in that publication, a caller with minutes to transfer calls an interactive system, which prompts the caller for a phone number of an intended recipient and the number of minutes or amount of time that should be transferred. The caller's account is thereafter debited that number of minutes or amount of time whereas the recipient's account is credited with the same number of minutes or amount of time.

U.S. Pat. No. 6,424,706 goes one step further and not only describes transferring minutes from one phone account to another, but also describes allowing the recipient of the minutes to redeem those minutes for goods and services, including the cash value of the minutes.

Even in view of the recent advances and enhancements in prepaid services that are known to those skilled in the art, there are nevertheless areas in which prepaid telephone service, especially wireless telephone service, can be improved.

SUMMARY OF THE INVENTION

In accordance with an embodiment of the present invention there is provided a method of transmitting value via a telephone system, including receiving a request from a Grantor to designate a predetermined number of minutes that are to be reserved to fund a telephone call between a telephone number associated with a Beneficiary and a telephone number belonging to the Grantor, receiving a request to establish the telephone call between the telephone number associated with the Beneficiary and the telephone number belonging to the Grantor, establishing the telephone call between the telephone number associated with the Beneficiary and the telephone number belonging to the Grantor, and deducting from the predetermined number of minutes a number of minutes corresponding to a length of time of the call between the telephone number associated with the Beneficiary and the telephone number belonging to the Grantor.

The method may further include, during the step of receiving a request from the Grantor, detecting the telephone number of the Grantor using automatic number identification (ANI), communicating with the Grantor using an interactive voice response (IVR) system, requesting that the Grantor enter a security code or password, and receiving the telephone number of the Beneficiary.

The method may further include providing a confirmation code to the Grantor that confirms the number of minutes that are to be reserved.

In one possible implementation, the step of receiving a request to establish the telephone call between the telephone number associated with the Beneficiary and the telephone number belonging to the Grantor comprises receiving the request from a mobile virtual network operator.

In a preferred embodiment, the method further includes sequestering a first portion of the predetermined number of minutes to ensure that at least a portion of the call between the telephone number associated with the Beneficiary and the telephone number belonging to the Grantor will be funded, and may further include receiving a request for sequestering a second portion of the predetermined number of minutes as the first portion is consumed.

At the completion of a call, the method preferably returns any unconsumed minutes to a pool of minutes available for subsequent telephone calls.

In another embodiment, the present invention provides a method of transferring value using a telephone system that includes reserving, in a prepaid pool of minutes, a predetermined number of minutes for funding a telephone call between a first telephone number and a second telephone number, each minute having a calculable monetary value, receiving a request for a predetermined number of minutes to be consumed by a person associated with the first telephone number and making an inquiry regarding a balance of the prepaid pool of minutes, if the balance is sufficient to fund the number of minutes to be consumed by the person associated with the first telephone number, receiving a confirmation number previously given to a person associated with the second telephone number, the confirmation number having been separately communicated by the person associated with the second telephone number to the person associated with the first telephone number, and thereafter making available to the person associated with the first telephone number at least the monetary value of the requested predetermined number of minutes to be consumed.

In accordance with the present invention, the monetary value may be made available in the form of, e.g., cash or in the form of telephone credit.

Further in accordance with this embodiment, the method provides for receiving a request to initiate a call-back tie line between the persons associated with first and second telephone lines.

In accordance with still another embodiment of the present invention there is provided a method of transferring value from a Grantor to a Beneficiary using a mobile telephone system, including allocating on behalf of a Grantor a pool of minutes designated to fund a subsequent telephone call from a predetermined telephone number belonging to a Beneficiary, establishing a telephone call, initiated by the Beneficiary, between the Grantor and Beneficiary, sequestering a first portion of the minutes in the pool of minutes to fund at least a portion of the telephone call, and sequestering a second portion of the minutes in the pool of minutes if the first portion is consumed by virtue of the length of the telephone call.

17. The method of claim 16, further comprising, completing a dial-back tie line between service provides servicing the Grantor and the Beneficiary.

These and other features of the present invention and their attendant advantages will be more fully appreciated upon a reading of the following detailed description in conjunction with the associated drawings.

DETAILED DESCRIPTION

Figure 1:
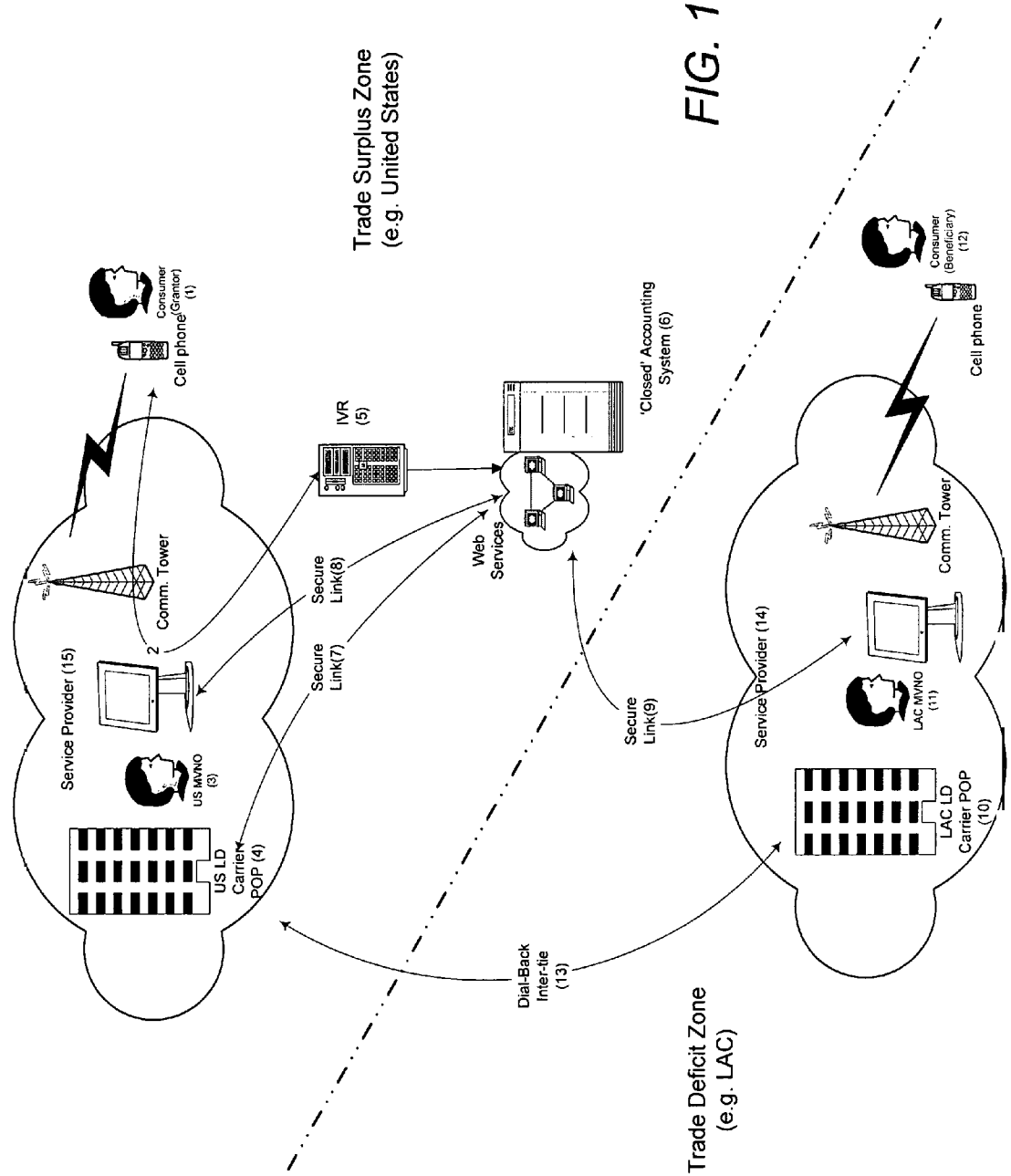
FIG. 1 illustrates an exemplary topology in accordance with an embodiment of the present invention.

In accordance with principles of the present invention, rather than 'send' minutes as disclosed by the prior art, the party with minutes to send (the "Grantor" of minutes) establishes 'prepaid collect' minutes for the other party (the "Beneficiary"). The minutes themselves do not go anywhere until they are consumed. In accordance with embodiments of the invention, the user/Grantor calls, e.g., an interactive voice recognition (IVR) system, and chooses an option to establish "prepaid collect" minutes for another, perhaps international, party's (phone) number. The Grantor could alternately choose to go to his/her local Mobile Virtual Network Operator (MVNO) office and accomplish the same thing (i.e., establish 'prepaid collect' minutes for another party/Beneficiary). The designated minutes may be accounted for within the Grantor's existing mobile carrier's account, or within a separate accounting system, perhaps run by a third party.

The Beneficiary may then use those minutes by calling the Grantor of the 'prepaid collect' minutes from a participating MVNO (network reseller). The 'prepaid collect' minutes fund the call since the minutes were specifically designated to fund calls received from the Beneficiary's telephone number. The Beneficiary may also go to his or her local MVNO office and ask to redeem the 'prepaid collect' minutes set aside for their (phone) number for goods or services, or even cash.

What this does (via either calls or redemption) is establish a trade-deficit between the two (sending and receiving) MVNOs. This trade deficit may then be balanced in part or full through a barter system, as explained below.

If there is a difference in rates such that the Grantor enjoys a better rate when initiating a call than the Beneficiary in the other country, this rate differential can be exploited as one means to reduce the trade imbalance. Historically this has been true such that the US, with it's purchasing power, has enjoyed lower rates as compared with persons in Mexico initiating a call to someone in the US. This isn't necessarily true in every case, and may diminish as internet-based calling (Voice Over IP, or VoIP) levels the rate playing field.

Beyond non-reciprocal rates for the calls and minutes, participating MVNOs might also trade the phones themselves, or the MVNO in the Grantor's country might simply pay all the charges associated with the incoming calls (100% rate differential!). In each case, the goal is to take advantage of any opportunity to barter and at the same time avoid or at least diminish the need to transfer funds between the MVNOs via the banking system.

The present invention provides for balancing the trade deficit by effecting or using dial-back for calls into the US initiated by a Mexican caller (instant example), and the difference in rates (e.g. $0.10/minute), or even the full call expense, is used to reduce the deficit and thereby bring any imbalance of trade into balance.

More particularly, and as an example, a caller/Beneficiary in Mexico (MX) places the call, a MX MVNO sets up a dial-back call with their carrier, their carrier signals the US carrier to a) call the destination (US) party/Grantor AND b) call the MX party/Beneficiary and connect the two calls. In this way, the call looks to be initiated from the US and enjoys the better calling rates. Typically, some type of out-of-band signaling (internet) is used for the MX carrier to direct the US carrier to arrange the dial-back.

In sum, the consuming (MX) caller/Beneficiary creates a deficit by making a collect call or redeeming the US party's/Grantor's minutes. All MVNO and carriers are compensated for a) the MX caller's consumption of minutes or b) the MX customer's redemption of minutes, as US to MX calls are being funded by the accumulated surplus of consumed 'prepaid collect' minutes being accounted for and held in the US. The US MVNO and/or US Carrier interact with an accounting system to establish and maintain balances for each 'prepaid collect' entry, carrier, or MVNO.

Ideally, no money flows between countries—the system and methodology is pure barter. As such, banks need not be involved in the service.

As necessary, however, the MVNO's may be registered as money transmitter businesses per the appropriate regulatory agencies in the countries involved.

Reference is now made to the FIG. 1 that shows Consumer/Grantor (1) in communication with a service provider (15), which can be a long distance carrier (4) having a point of presence (POP) in the U.S. or, alternatively, a U.S.-based mobile virtual network operator (MVNO) (3). Another service provider (14), which may include a long distance local area carrier (LAC) with a point of presence or MVNO (11) in a non-U.S. country. Service provider (14) serves Consumer/Beneficiary (12).

FIG. 1 also depicts interactive voice response (IVR) system (5) and a "closed" accounting system (6). As shown, IVR (5) may be contacted by Grantor (1) through service provider (15). IVR (5) is further in communication with closed accounting system (6). Several secure links (7), (8) and (9) interconnect service providers (15) and (14) to closed accounting system (6). These connections may be implemented using internet web services, but those having skill in the art will appreciate that any (though preferably secure) communication method may be employed to establish connectivity among the entities shown.

Finally, a dial-back inter-tie line (13) is shown between the long distance carriers (4) and (10).

Use Case 1—Setting Up Prepaid-Collect Minutes Caller

1 Consumer/Grantor (1) calls (2) an interactive voice-response (IVR) unit (5).
2 IVR (5) identifies caller using their phone's number via, e.g., automatic number identification (ANI).
3 Optionally, for security, Consumer/Grantor (1) enters a security code.
4 Successfully identified, the IVR(5) prompts Consumer/Grantor (1) to enter the phone number of the party/Beneficiary for which the Prepaid-Collect minutes are to be available.
5 Consumer/Grantor (1) enters in the phone number (PH#).
6 IVR(5) prompts for the number of minutes set aside for that phone number.

7 Consumer/Grantor (1) enters minutes (#MIN).

8 IVR(5) repeats that (#MIN) minutes will be set aside for phone number (PH# entered) and asks for confirmation (e.g., 1=Yes, 2=No).

9 Consumer/Grantor (1) confirms or cancels transaction

10 IVR(5) acknowledges choice, plays appropriate message.

11 If Consumer/Grantor (1) confirmed the transaction, #MIN minutes are set aside for use by PH# and a confirmation code is given to the Consumer/Grantor (1). The call is then ended.

12 If Consumer/Grantor (1) cancels the transaction, the IVR(5) returns to step 4 above.

Use Case 1a—Setting Up Prepaid-Collect Minutes Caller

1 Consumer/Grantor (1) walks into local service provider (15) and requests Prepaid-Collect minutes be set up for another phone number, i.e., Consumer/Beneficiary (12).

2 Consumer/Grantor (1) pays for or allows use of existing minutes to establish Prepaid-Collect minutes for the other phone number (12).

3 Service provider (15) gives confirmation code to Consumer/Grantor (1).

Use Case 2—Remote Caller/Beneficiary Making Use Paid-Collect Minutes

1 Consumer/Beneficiary (12) of a participating Service Provider (14) (such as local carrier, value-added reseller/MVNO, cellular company, etc.) initiates call.

2 Consumer/Beneficiary (12) dials Consumer/Grantor(1) who has previously set up Prepaid-Collect minutes for Caller(12)

3 Consumer/Beneficiary's (12) service provider (14) transmits the call request to a participating service provider (15), along with a request for a minimum balance of minutes to complete the call.

4 Service provider (15) responds YES/NO depending upon the availability of Prepaid-Collect minutes to pay for the call, making unavailable the number of minutes requested pending call completion.

5 During the course of a call, SP (14) may request additional minutes as the previously allocated minutes are consumed.

6 If the additional minutes requested are available, the call continues and the additional minutes requested are also sequestered while they are being consumed.

7 If additional minutes are unavailable, alternatives are given to the Consumer/Beneficiary or Consumer/Grantor to continue the call, if alternatives are available, or the call is terminated.

8 At the end of a call, unused minutes are returned to the pool previously set up by Consumer/Grantor(1) and are available for future calls.

Use Case 3—Remote Consumer/Beneficiary 'Redeeming' Prepaid-Collect Minutes for Local Currency or Local-Account Credit.

1 Consumer/Beneficiary (12) enters local service provider's (14) office.

2 Consumer/Beneficiary (12) requests redemption of funds from Consumer/Grantor(1) Prepaid-Collect pool of minutes.

3 Service provider 14 obtains Consumer/Beneficiary (12)'s phone number and Consumer/Grantor(1)'s phone number and performs a balance inquiry for the Consumer/Grantor(1) using a secure web link (9).

4 If sufficient balance is present, service provider 14 requests the confirmation code given when the Prepaid-Collect minutes were established. Having this code means the Consumer/Grantor (1) has somehow communicated the confirmation code to the Consumer/Beneficiary (12).

5 Service provider (14) enters the confirmation code and number of minutes being redeemed using the secure link (9).

6 The accounting system (6) reduces the Consumer/Grantor's (1) Prepaid-Collect balance and credits the service provider's (14) minute balance appropriately.

7 Prepaid-Collect minutes are now available for service provider (14)'s use elsewhere, possibly for callers who have no other funding source, as a means to reduce service provider (14)'s basis (cost) for other call completion.

8 Service provider (14) gives Consumer/Beneficiary (12) cash funds or phone credit as requested.

Figure 2:
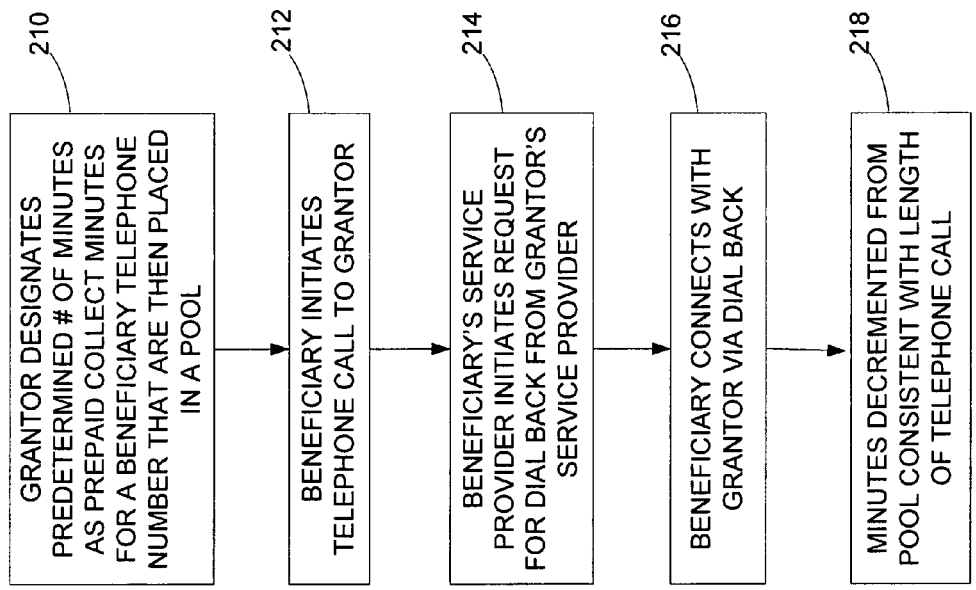
FIG. 2 is an exemplary flowchart depicting a series of steps in accordance with an embodiment of the present invention.

FIG. 2 is a flowchart that depicts an exemplary series of steps in accordance with an embodiment of the invention.

As a shown, as step 210, grantor designates a predetermined number of minutes to be reserved for calls received from a predetermined beneficiary telephone number. These minutes are then placed in a pool minutes that may be consumed. At step 212, the Beneficiary initiates a telephone call to the Grantor, whereupon at step 214, the Beneficiary's service provider initiates a request for a dial back from the Grantor's service provider. In this way, the call (ongoing at step 216) will actually be deemed to be initiated from the Grantor's service provider and calls will therefore be charged at the Grantor's service provider rates (including long distance rates).

At the call's completion, or periodically during the call, minutes that have been consumed or used are decremented from the established pool of minutes consistent with the length of the telephone call (or portions thereof as the case may be).

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of transmitting value via a telephone system, comprising:

receiving a request from a Grantor to designate a predetermined number of minutes that are to be reserved to fund a telephone call between a telephone number associated with a Beneficiary and a telephone number belonging to the Grantor;

receiving a request to establish the telephone call between the telephone number associated with the Beneficiary and the telephone number belonging to the Grantor;

establishing the telephone call between the telephone number associated with the Beneficiary and the telephone number belonging to the Grantor; and deducting from the predetermined number of minutes a number of minutes corresponding to a length of time of the call between the telephone number associated with the Beneficiary and the telephone number belonging to the Grantor.

2. The method of claim 1, further comprising, during the step of receiving a request from the Grantor, detecting the telephone number of the Grantor using automatic number identification (ANI).

3. The method of claim 1, further comprising, during the step of receiving a request from the Grantor, communicating with the Grantor using an interactive voice response (IVR) system.

4. The method of claim 1, further comprising, during the step of receiving a request from the Grantor, requesting that the Grantor enter a security code or password.

5. The method of claim 1, further comprising, during the step of receiving a request from the Grantor, receiving the telephone number of the Beneficiary.

6. The method of claim 1, further comprising providing a confirmation code to the Grantor that confirms the number of minutes that are to be reserved.

7. The method of claim 1, wherein the step of receiving a request to establish the telephone call between the telephone number associated with the Beneficiary and the telephone number belonging to the Grantor comprises receiving the request from a mobile virtual network operator.

8. The method of claim 1, further comprising sequestering a first portion of the predetermined number of minutes to ensure that at least a portion of the call between the telephone number associated with the Beneficiary and the telephone number belonging to the Grantor will be funded.

9. The method of claim 8, further comprising receiving a request for sequestering a second portion of the predetermined number of minutes as the first portion is consumed.

10. The method of claim 8, further comprising returning any unconsumed minutes to a pool of minutes available for subsequent telephone calls.

11. A method of transferring value using a telephone system, comprising:

reserving, in a prepaid pool of minutes, a predetermined number of minutes for funding a telephone call between a first telephone number and a second telephone number, each minute having a calculable monetary value;

receiving a request for a predetermined number of minutes to be consumed by a person associated with the first telephone number and making an inquiry regarding a balance of the prepaid pool of minutes;

if the balance is sufficient to fund the number of minutes to be consumed by the person associated with the first telephone number, receiving a confirmation number previously given to a person associated with the second telephone number, the confirmation number having been separately communicated by the person associated with the second telephone number to the person associated with the first telephone number; and thereafter making available to the person associated with the first telephone number at least the monetary value of the requested predetermined number of minutes to be consumed.

12. The method of claim 11, wherein the monetary value is made available in the form of cash.

13. The method of claim 11, wherein the monetary value is made available in the form of telephone credit.

14. The method of claim 11, wherein the request is received via the Internet.

15. The method of claim 11, further comprising receiving a request to initiate a call-back tie line between the persons associated with first and second telephone lines.

16. A method of transferring value from a Grantor to a Beneficiary using a mobile telephone system, comprising:

allocating on behalf of a Grantor a pool of minutes designated to fund a subsequent telephone call from a predetermined telephone number belonging to a Beneficiary;

establishing a telephone call, initiated by the Beneficiary, between the Grantor and Beneficiary;

sequestering a first portion of the minutes in the pool of minutes to fund at least a portion of the telephone call; and sequestering a second portion of the minutes in the pool of minutes if the first portion is consumed by virtue of the length of the telephone call.

17. The method of claim 16, further comprising, completing a dial-back tie line between service provides servicing the Grantor and the Beneficiary.

18. The method of claim 16, further comprising enabling the Beneficiary to redeem minutes from the pool of minutes.

19. The method of claim 18, further comprising receiving a confirmation code from the Beneficiary evidencing a prior communication between the Grantor and Beneficiary.

* * * * *